US009921679B2

United States Patent
Son et al.

(10) Patent No.: US 9,921,679 B2
(45) Date of Patent: Mar. 20, 2018

(54) FORCE-SENSING TOUCH SCREEN INPUT DEVICE

(71) Applicants: Jae S. Son, Rolling Hills Estates, CA (US); Sang Youl Han, Seoul (KR)

(72) Inventors: Jae S. Son, Rolling Hills Estates, CA (US); Sang Youl Han, Seoul (KR)

(73) Assignee: Pressure Profile Systems Inc., Los Angeles, CA (US)

( * ) Notice: Subject to any disclaimer, the term of this patent is extended or adjusted under 35 U.S.C. 154(b) by 89 days.

(21) Appl. No.: 14/952,994

(22) Filed: Nov. 26, 2015

(65) Prior Publication Data

US 2017/0102809 A1   Apr. 13, 2017

Related U.S. Application Data

(60) Provisional application No. 62/239,919, filed on Oct. 11, 2015.

(51) Int. Cl.
*G06F 3/041* (2006.01)
*G06F 3/044* (2006.01)

(52) U.S. Cl.
CPC .......... *G06F 3/0414* (2013.01); *G06F 3/0412* (2013.01); *G06F 3/044* (2013.01); *G06F 3/0416* (2013.01); *G06F 2203/04102* (2013.01)

(58) Field of Classification Search
CPC .................. G06F 3/0414; G06F 3/044; G06F 2203/04103; G06F 2203/04105
USPC .................................................. 345/174, 173
See application file for complete search history.

(56) References Cited

U.S. PATENT DOCUMENTS

| RE42,064 E | 1/2011 | Fish | |
|---|---|---|---|
| 7,999,660 B2 * | 8/2011 | Cybart | ................... G06F 3/016 340/12.54 |
| 8,169,332 B2 | 5/2012 | Son | |
| 8,633,916 B2 | 1/2014 | Bernstein | |
| 8,797,295 B2 | 8/2014 | Bernstein | |
| 8,988,384 B2 | 3/2015 | Krah | |
| 2003/0026971 A1 * | 2/2003 | Inkster | ..................... B32B 5/18 428/304.4 |

(Continued)

FOREIGN PATENT DOCUMENTS

| AU | 2015100030 | 2/2015 |
|---|---|---|
| JP | 2011-100364 | 5/2011 |
| KR | 2011-0128724 | 11/2011 |

*Primary Examiner* — Yuzhen Shen
(74) *Attorney, Agent, or Firm* — Boris Leschinsky

(57) ABSTRACT

A force sensing touch screen input device is a solid assembly of multiple layers including a display with a touch-sensitive external surface, a first and second electrode layers separated by a compressible dielectric structure—forming a capacitive force-sensing array, and a rigid planar substrate. One or both electrode layers may be formed by metallizing a polymer surface of the rigid substrate or by creating a conductive electrode onto an internal surface of the display. To increase reliability, each layer is permanently adhered to or formed onto an adjacent layer over its entire surface, whereby preventing internal shifts therebetween. To increase response time, the cover glass flexibility, compressible dielectric structure and the gasket structure between the cover glass and the rigid planar substrates are selected to provide elastic compression and recovery during normal operating conditions.

8 Claims, 11 Drawing Sheets

(56) References Cited

U.S. PATENT DOCUMENTS

| | | | |
|---|---|---|---|
| 2011/0096013 A1* | 4/2011 | Krumpelman | G06F 3/016 345/173 |
| 2011/0148812 A1* | 6/2011 | Hente | H03K 17/962 345/174 |
| 2012/0194974 A1* | 8/2012 | Weber | C03C 21/002 361/679.01 |
| 2014/0028575 A1 | 1/2014 | Parivar | |
| 2014/0092064 A1 | 4/2014 | Bernstein | |
| 2015/0123911 A1* | 5/2015 | Poliakov | G06F 3/041 345/173 |
| 2016/0062500 A1* | 3/2016 | Kessler | G06F 3/0414 345/174 |
| 2016/0098131 A1* | 4/2016 | Ogata | G06F 1/1643 345/173 |
| 2016/0139716 A1* | 5/2016 | Filiz | G06F 3/0414 345/174 |
| 2016/0299598 A1* | 10/2016 | Yoon | G06F 3/044 |

\* cited by examiner

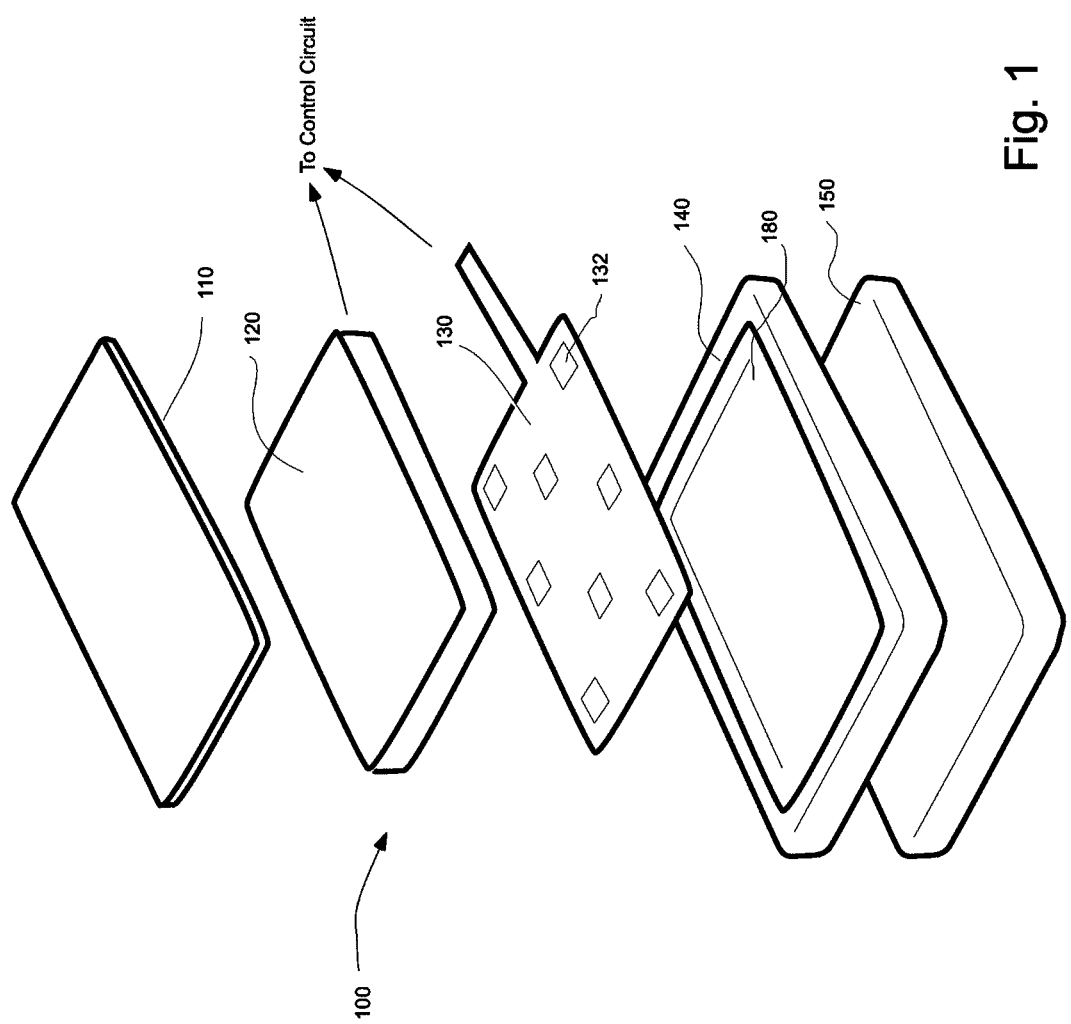

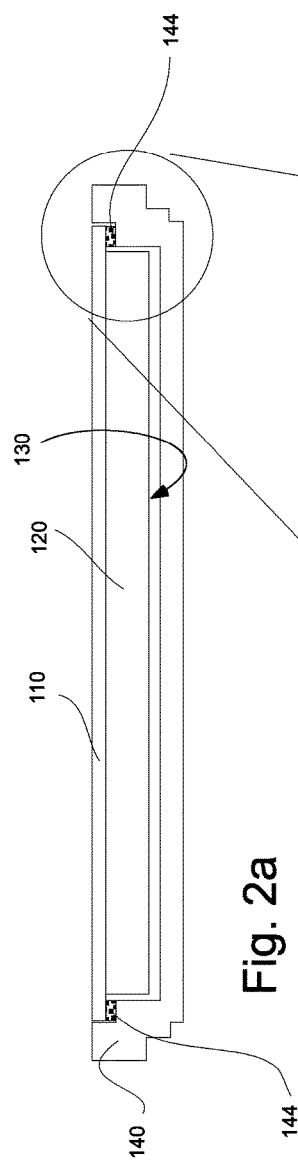
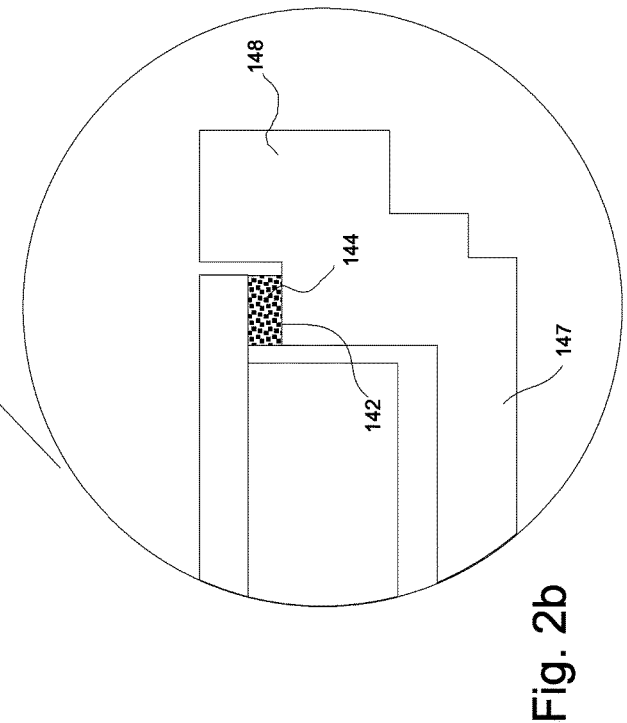
Fig. 2a
Fig. 2b

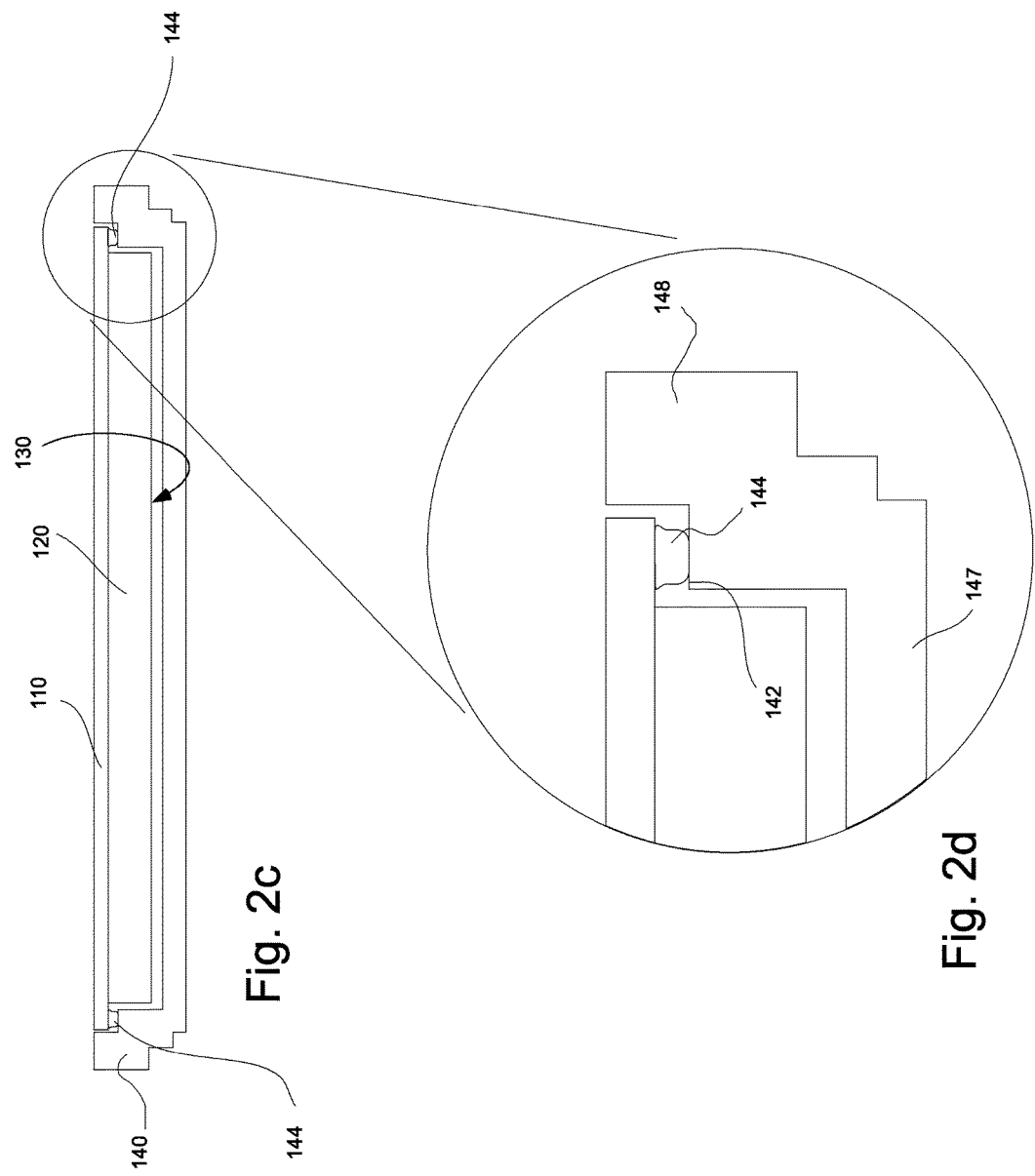

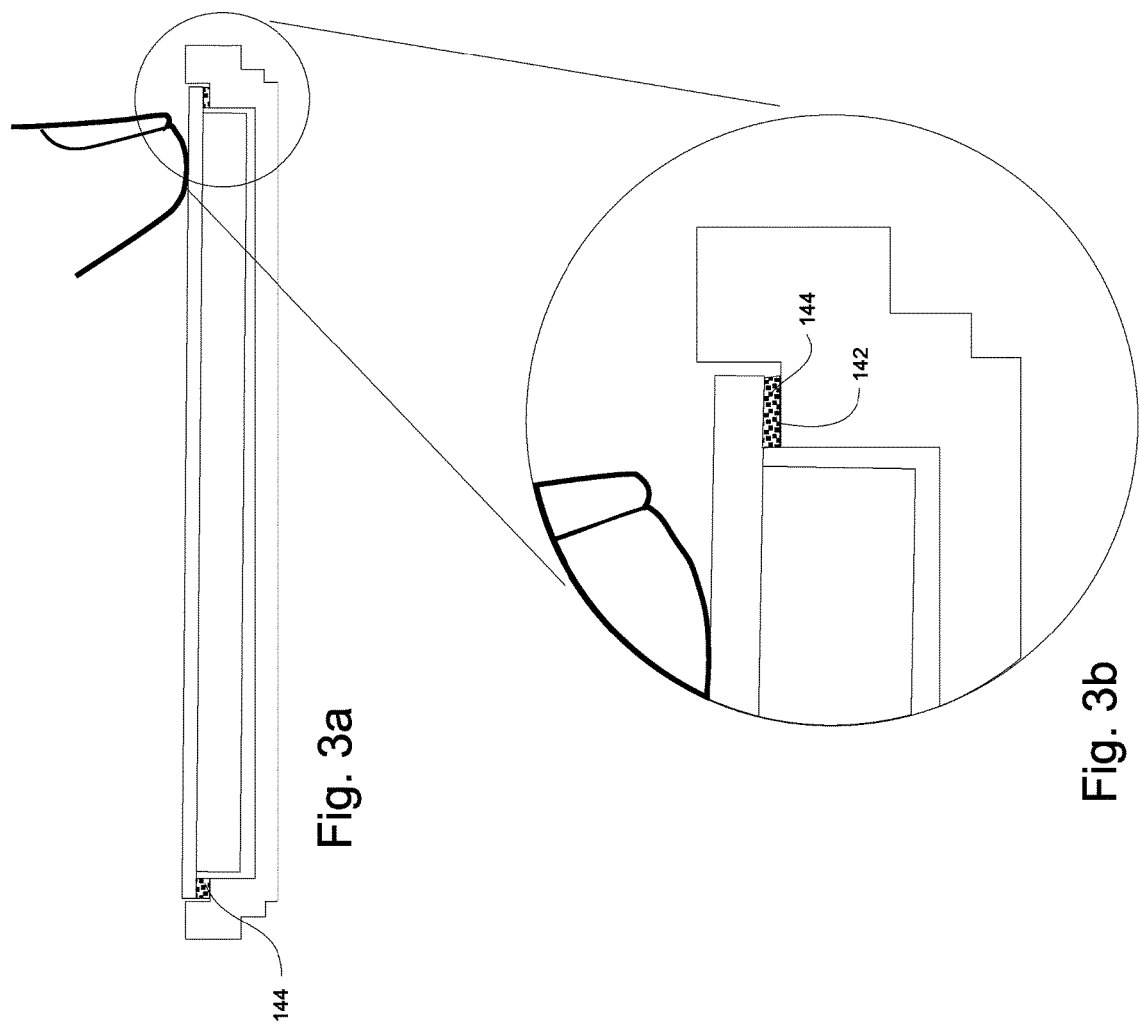

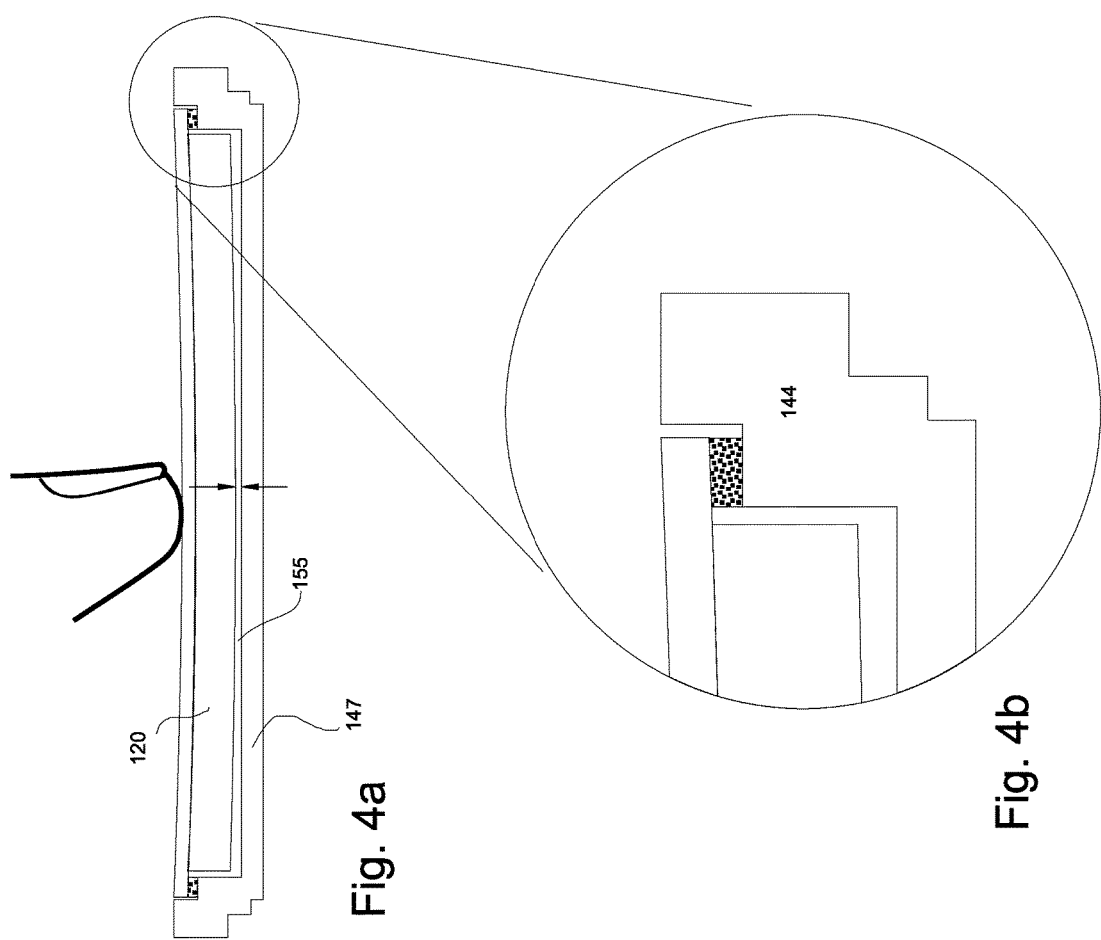

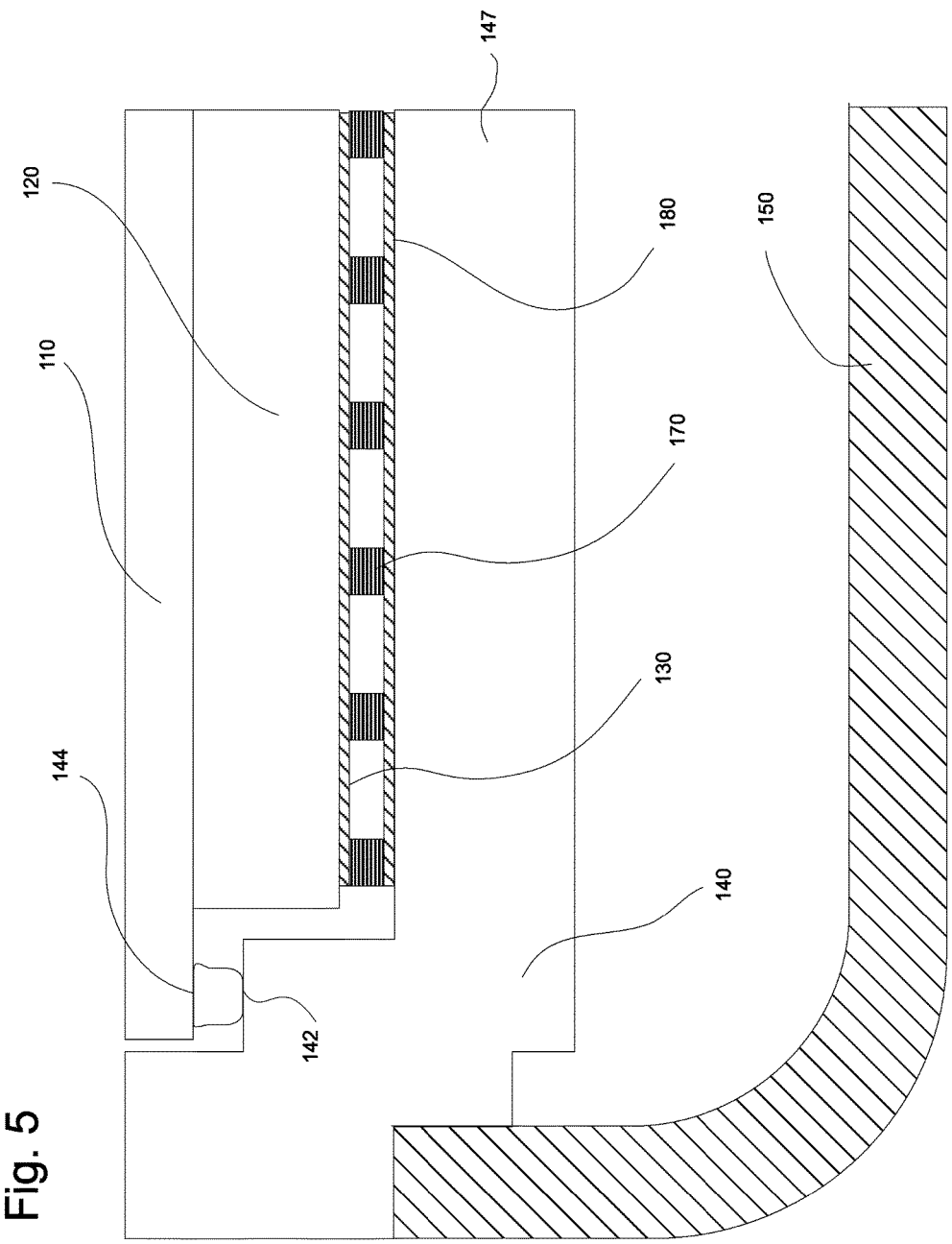

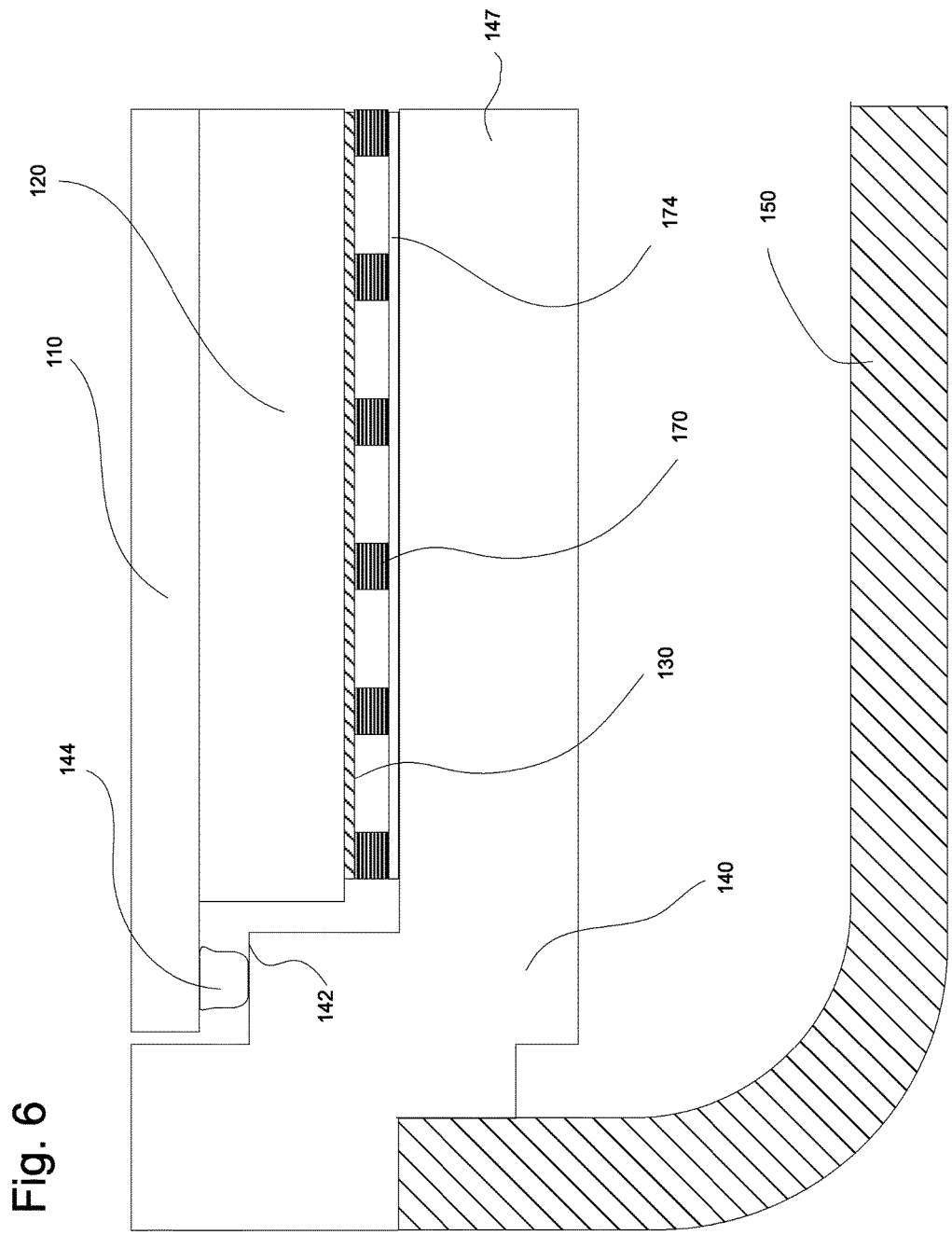

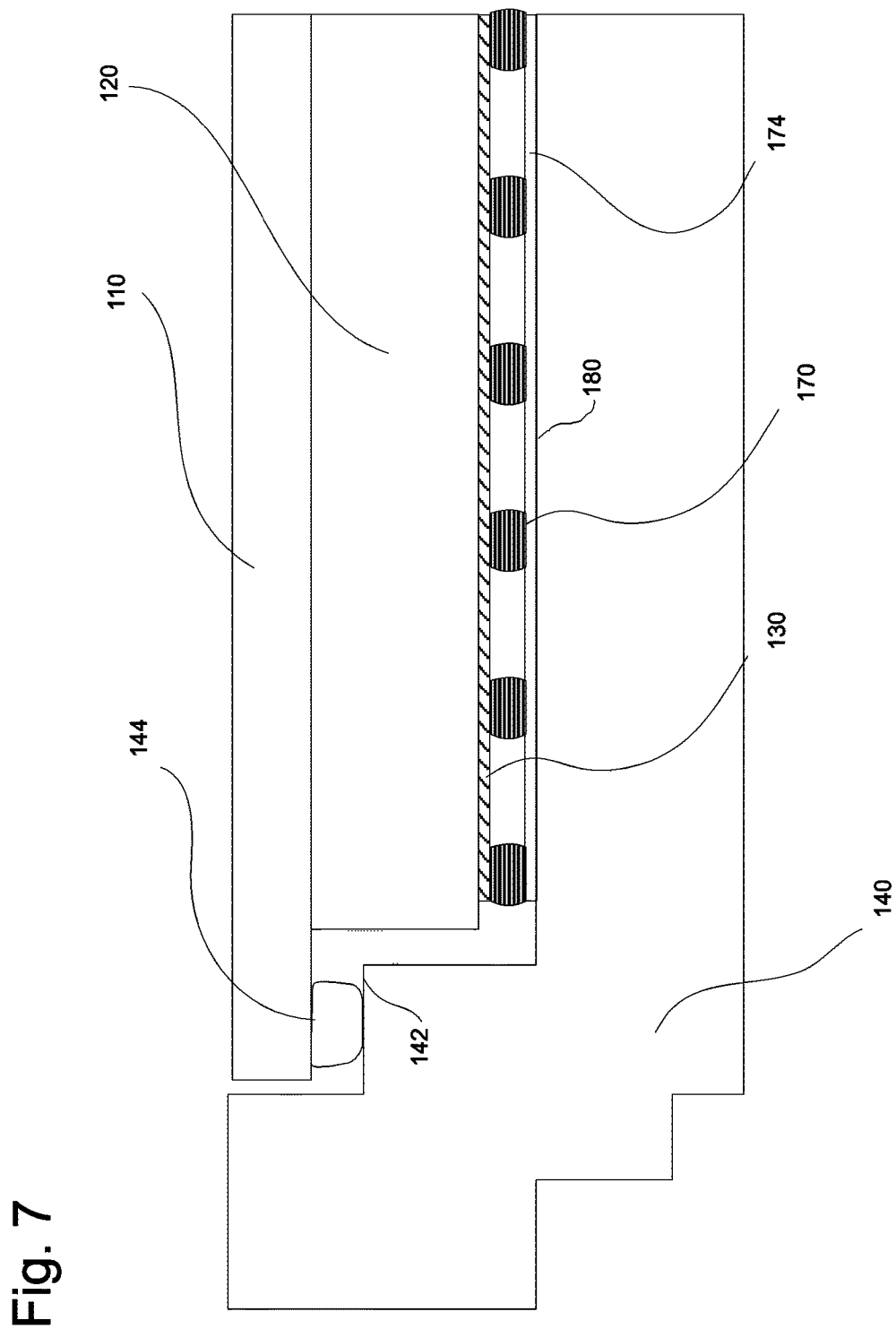

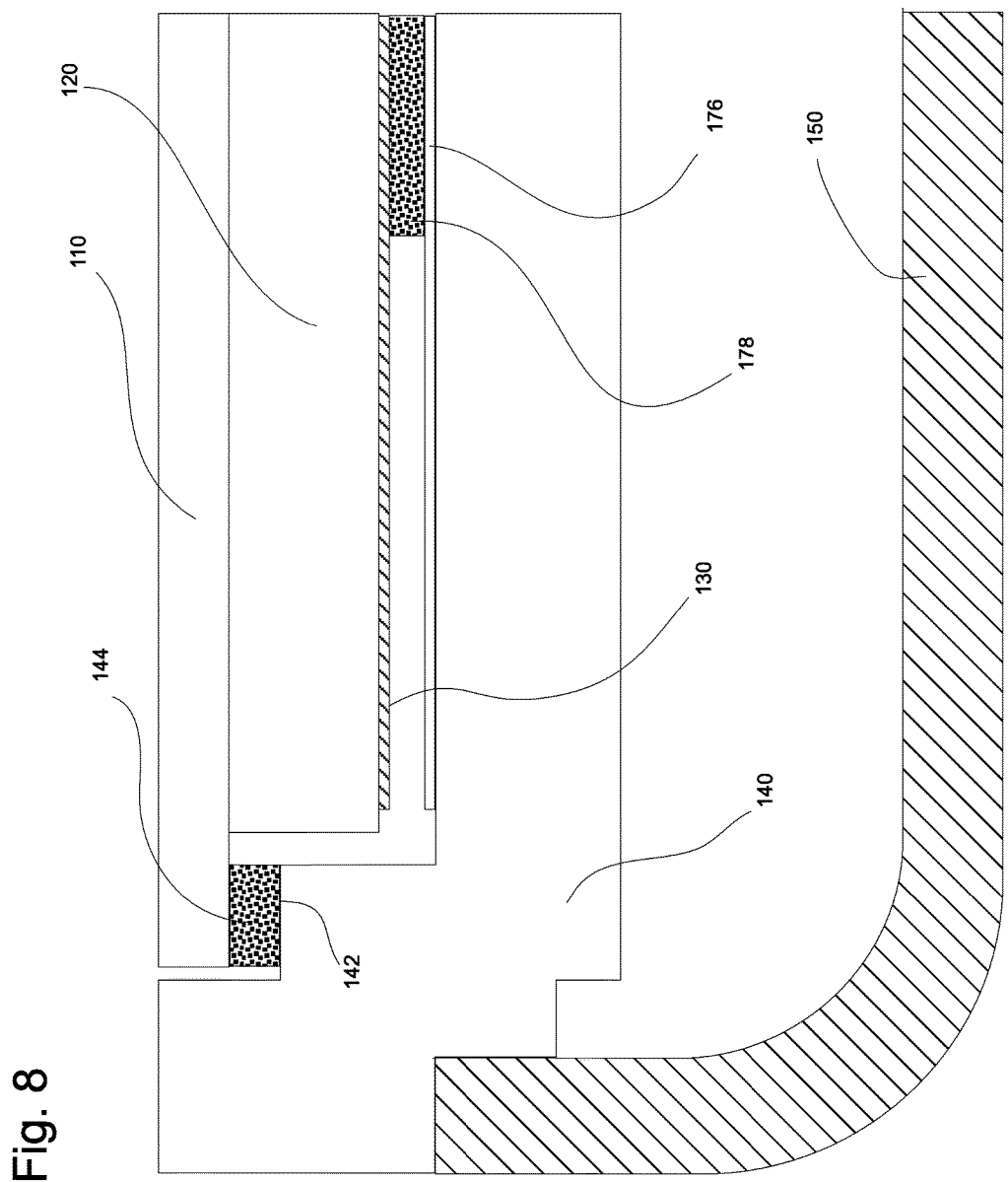

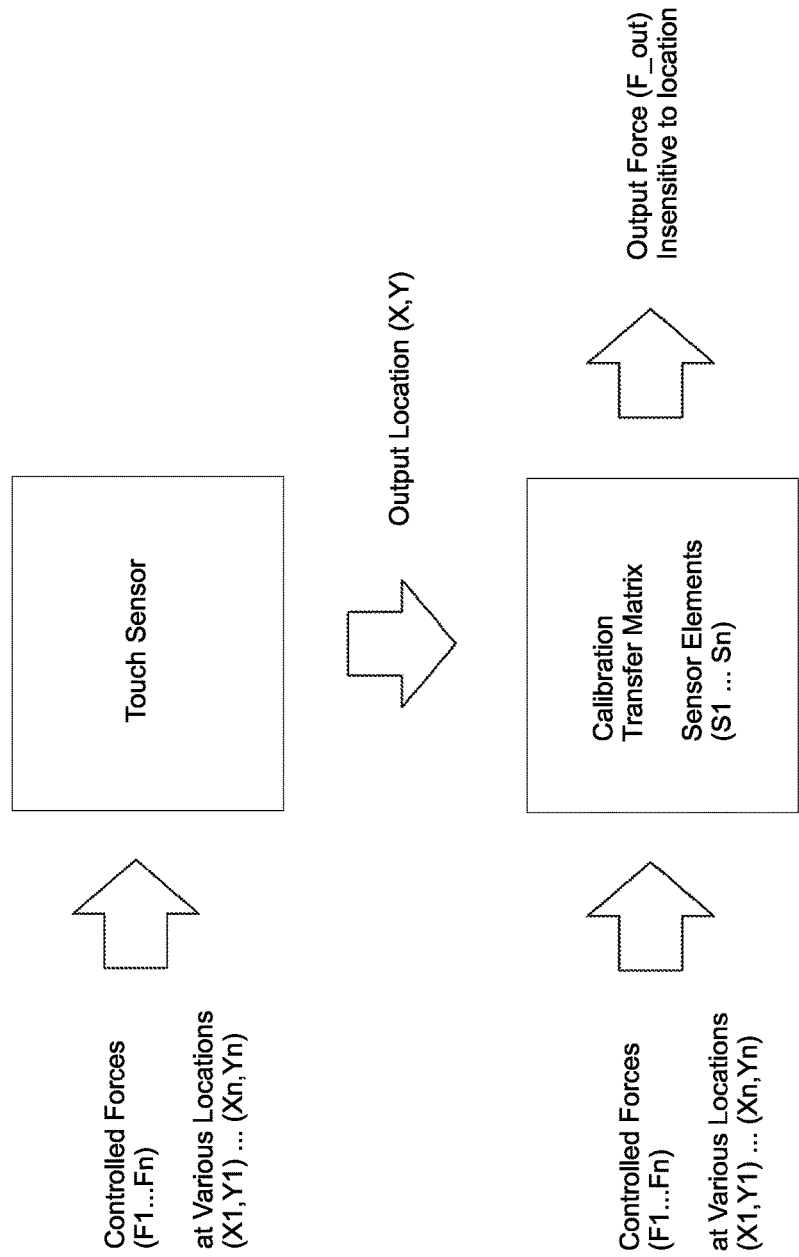

FORCE-SENSING TOUCH SCREEN INPUT DEVICE

CROSS-REFERENCE DATA

This application claims a priority date benefit from a U.S. Provisional Patent Application No. 62/239,919 filed 11 Oct. 2015 with the same title, the content of which is incorporated herein by reference in its entirety.

BACKGROUND OF THE INVENTION

This present invention generally relates to tactile input devices and more specifically to tactile input devices with integral touch input surfaces and force-measuring capability.

Tactile input devices, that quantify the level of force being applied to a surface, are becoming more popular in a variety of applications. Cellular telephones, smartphones, tablets, laptops, personal digital assistants (PDAS), "smart" watches and other electronic devices seek to incorporate greater numbers of functions in such devices for a given volume. Tactile input devices can provide this capability. This has led to a number of approaches for providing input devices that utilize capacitive, resistive, strain gauge and other types of sensors.

For example, U.S. Pat. No. 7,609,178 to Son et al. discloses a reconfigurable tactile sensor input device. The input device uses capacitive sensing and includes a first rigid electrode layer, a compressible dielectric structure and a second flexible electrode layer. The dielectric structure may include a matrix of compressible geometric elements with voids therebetween. This approach provides the device with the ability to measure varying levels of tactile force. An optional flexible display may be mounted over the input device to indicate the present configuration to the device, which configuration can change from time to time based upon various inputs.

U.S. Pat. No. 7,595,788 to Son discloses an electronic device housing with an integrated user input capability. This device measures the force level applied by the individual to a housing for an electronic device. A capacitive sensor is formed between a conductive inside surface of the housing and an electrode on a rigid base. The application of force to the housing deflects a corresponding portion thereby causing a change in capacitance across the sensor.

In addition to the developments such as those described above, efforts have also been directed to the development of touch location devices, such as touch screens. U.S. Pat. No. 7,148,882 to Kamrath et al. discloses a complex to build capacitor-based force sensors that detect a difference caused by an applied force over a continuous range of applied forces that includes a zero force. A number of these sensors are distributed under an input structure. When a force is applied, the forces as measured by the capacitance properties of each sensor are converted into the position of the applied force on the input structure.

U.S. Pat. No. 7,183,948 to Roberts discloses a tangential force control touch location device that includes force sensor principal elements, lateral softening means and preload springs. A mechanical path, that does not include the force sensors, comprises a plurality of shunt connections that constitute the lateral stiffening means for impeding lateral motion of the touch surface.

Each of the foregoing references discloses different approaches. Manufacturers who wish to incorporate a touch screen with a tactile input device such as shown in the above-identified patent publications purchase the input device from one vendor and the touch screen device from another vendor. Then the manufacturer must determine an approach for integrating the two. Generally the electronics associated with each component are not compatible, so different processing approaches must be undertaken. This may further increase the price and size of the input device to accommodate the different circuits in the device or require more complex signal transfers to external electronic and processing components.

In general, there are several methods to measure force on a touch-sensitive screen. This can be done by:
  using sensors on the corners of the display (such as in a Force Pad),
  deploying pressure sensors surrounding the display (as in Apple Watch™)
  using a deformation of the cover plate on top of a capacitive sensing display (as in Apple 6S iPhone™), or
  positioning pressure sensors beneath the display.

Several examples of prior art disclose positioning one or more thin pressure sensors underneath the display. Display is then allowed to slightly flex elastically or move down and compress spring-loaded supporting structure when an external force is applied to the screen surface. Force sensors may be adapted to capture that motion of the display and transform into a force signal. U.S. Pat. No. 8,169,332 to Son discloses one such design. Another example may be found in Japanese Pat App. No. JP 2011-100364.

Straight forward deployment of an array of thin film pressure sensors underneath the display presents a disadvantage of being too expensive because of multiple layers of electrodes needed to fabricate the sensor.

Using such devices in cellular phones, tablets or other electronics dictates a requirement of extra reliability as these devices may be occasionally dropped, mishandled, compressed or subjected to other conditions of shock and vibration.

The need exists therefore for a force-sensing input device that provides a touch screen display along with optional various keyboard configurations whereby the cost of the device is minimized and reliability of assembly is enhanced so as to make it practical for use in cellular phones, tablets and other small or thin electronics.

SUMMARY OF THE INVENTION

Therefore, it is an object of this invention to provide a force-sensing input device that incorporates an integral touch screen display or another touch input surface.

Another object of this invention is to provide a force-sensing tactile input device with an integral touch screen display or another touch input surface that minimizes the device costs.

Yet another object of this invention is to provide a force-sensing tactile input device with an integral touch screen display that can provide reliable input readings when used as part of a cellular phone or another portable electronic device prone to rough handling, occasional drops and other conditions of shock, vibration, or application of external forces.

A further object is to provide a force-sensing tactile input device void of any mechanical springs between the drive and sense electrode layers of the force-sensing portion of the device and assembled without retaining screws or fasteners in order to reduce device thickness and improve reliability.

Yet another objective of this invention is to provide a coordinated design that provides fast recovery of the force sensor by leveraging the process of how the sensor is built into a housing suitable for a mobile device.

The input device of the present invention and the electronic device incorporating thereof takes advantage of one, two, or all three compressible elements incorporated therein—namely a dielectric structure separating electrode layer; a gasket sealing the touch screen and a display, and flexibility of the cover glass. The invention features a multi-layer assembly comprising a touch-sensitive display and a force-sensing capacitive sensor array assembly located underneath thereof. The touch-sensitive display may be configured to detect the location of touch thereon while the capacitive sensor array assembly may be configured to detect the level of external force applied to the external surface of the display.

The input device may be housed and sealed in a rigid substrate and include a display with an external touch-sensitive surface facing outwards. The display may be supported on a raised ledge of the rigid substrate and sealed using a compressible gasket or other means. A capacitive force sensor array may be formed between the internal surface of the display facing inwards and the planar bottom portion of the rigid substrate. The sensor array may be formed using a first electrode layer, a second electrode layer and a compressible dielectric structure positioned inbetween to provide a predefined gap between the first and second electrode layers. Both the first and the second electrode layers may be positioned to cover at least a substantial portion or the entire area of the display including its central portion. Importantly, both the first and second electrode layers may be attached, adhered to or formed directly onto (or as part of) the respective surfaces of the display bottom and the planar top portion of the rigid substrate. The compressible dielectric structure may be adhered to both electrode layers, whereby holding the entire input device assembly together without any additional fasteners such as screws or snaps.

Constructing the input device as a single solid assembly in which various layers are permanently adhered to each other over their entire respective surfaces assures high reliability by avoiding shifts or sliding between layers when the electronic device is subjected to a drop, bend or another mechanical interference. At the same time, this design has an advantage of having low thickness which is desirable in modern hand-held electronic devices.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1 is an exploded view of the input device of the invention;

FIG. 2a shows a cross-section of the input device and FIG. 2b shows a close-up view of the detail illustrating how the display is supported by the rigid substrate through a compressible foam gasket;

FIGS. 2c and 2d show the same but with using a silicone gasket;

FIG. 3a shows a compression of the input device as a result of a touch by an external object near the periphery of the input device, while FIG. 3b shows a detail of the compression of the elastic foam gasket supporting the display and the cover glass;

FIGS. 4a and 4b show external pressure applied to the input device of the invention in a situation where the touch location is in the middle of the touch-sensitive display and away from the edges thereof;

FIG. 5 shows a cross-sectional close-up of a portion of the first embodiment of the input device of the invention showing two electrode layers forming a capacitive force-sensing array and a bottom cover protecting the rigid substrate from deformation;

FIG. 6 shows a cross-sectional close-up of a portion of the second embodiment of the input device of the invention showing two electrode layers forming a capacitive force-sensing array in which one electrode layer is attached to the display and another is formed as part of the rigid substrate;

FIG. 7 shows the second embodiment of the invention under compression by the external object;

FIG. 8 shows a cross-sectional close-up of a portion of the third embodiment of the input device of the invention in which the compressible dielectric structure is made of foam, and FIG. 9 shows a block-diagram of how the location and the forces applied to the input device of the invention are adjusted to remove dependance of force measurement on the position of touch on the display.

DETAILED DESCRIPTION OF THE PREFERRED EMBODIMENTS OF THE INVENTION

Figures 3C, 3D:
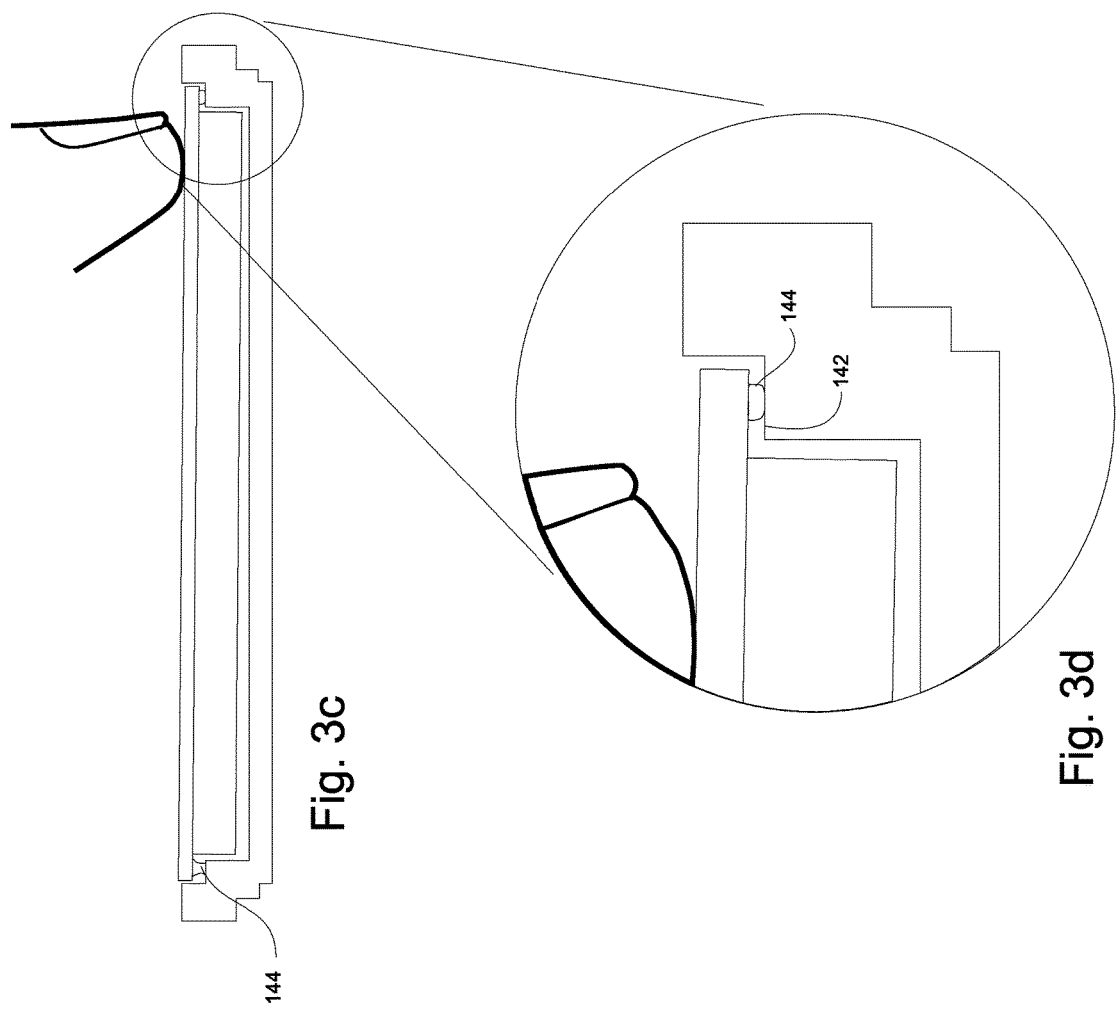
FIGS. 3c and 3d show the same but with a silicone gasket.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1 shows a general exploded view of the input device 100 of the present invention. Shown from the top are the cover glass 110 configured to protect the touch-sensitive display 120. The cover glass 110 may be bonded to the display 120 using a transparent adhesive or attached using other known methods so as to protect the display 120 while still allowing the detection of the location of touch over the surface thereof. The size of the cover glass 110 may extend beyond the size of the display 120 so as to cover the compressible elastic gasket 144 as described in more detail below.

Either one or both the cover glass 110 or the display 120 may be made from a glass material configured to provide extended elastic deformation during inward prolapse in response to a compression from an external force or an external object. One example of a suitable glass is Corning® Gorilla® Glass 4 by Corning Inc. (Corning, N.Y.), which is an alkali-aluminosilicate thin sheet glass with thickness ranging from about 0.4 mm to about 1.0 mm. This glass is known to have high resistance to scratch and sharp contact damage fracture toughness of 0.67 MPa m$^{0.5}$ that allows enhanced retained strength during use—even after multiple drops. This Gorilla® glass has a Young's Modulus of about 65.8 GPa and elastic properties unlike what is commonly thought of in terms of brittle glass behavior. When used as a cover glass, it prolapses elastically inward when compressed. When external force is removed, this glass instantly returns to its original shape. These elastic properties of the Gorilla® glass may be advantageously used to provide elastic deformation and rapid recovery when measuring force applied to the cover glass. The amount of deflection may be limited, whereby controlling the design of the device.

Any other glass with Young's Modulus of 40 GPa and above and a linear elastic deformation under applied force of less than about 1 lb. may be suitable for the present invention. Such glass may feature excellent mechanical recovery back to its straight shape when an external force is removed therefrom.

To detect the location of touch, the touch-sensitive display 120 may be made using known approaches to detect the location of touch. Proximity sensors for example may be positioned throughout the touch-sensing surface of the display 120 facing outward and configured to form a touch-sensing electrode array over that surface. Other sensors and technologies may also be used for such purpose as the invention is not limited in this regard. Examples of other suitable touch-sensing technologies may include other capacitive, resistive, strain gauge sensors, optical, infrared, ultrasound and electromagnetic sensors.

The touch-sensitive display 120 may be operably connected to a control circuitry (not shown) suitably configured to detect the location of touch depending on the type of touch-sensing technology. In case of using proximity touch sensors for example, the control circuitry may be configured to detect a change in capacitance over one or more proximity sensors of the proximity sensor array. Knowing the geometrical position of such sensors (such as row and column numbers) and detecting a change in capacitance thereof may be used to detect the location of touch (or locations of multiple touch points) on the touch-sensing surface of the display 120.

The input device 100 of the present invention may further include a rigid substrate 140 having a planar bottom portion 147 and a raised peripheral portion 148 surrounding thereof. The rigid substrate 140 may be made from metal or hard polymer and designed to not deform under normal use conditions. U.S. Pat. No. 8,169,332 by Son shows various suitable designs and examples aimed to provide additional rigidity and stability for the rigid substrate 140. Reinforcement ridges may further be provided on the external planar bottom portion of 147 for that purpose (not shown). While a machined metal structure may be made as a precise and stable structure 140, the cost of manufacturing prohibits this approach for mass market products, especially for the lower end (and lower cost) products. Consequently, die-cast metals with selective machining or injected molded plastics with glass fillers may be used to stiffen the structure of the rigid substrate. When plastics are used for making the rigid structure 140, whether stiffened with fillers or not, the inner surface thereof may be metalized to provide one of the electrode layers.

The raised peripheral portion 148 of the rigid substrate 140 may include a ledge 142 evenly spaced apart from the planar bottom portion 147—see FIGS. 2-8. In embodiments, a distance between the plane defined by the ledge 142 and the plane defined by the planar bottom portion 147 may be from about 1 mm to about 40 mm. A compressible elastic gasket 144 may be placed over the ledge 142 to seal the space below the display 120 and protect it from dust or fluids that may be present over the cover glass 110. Typically, a thin gasket foam material with a die cut adhesive (one- or two-sided) may be used to seal the edges (FIGS. 2a and 2b) because of the simplified manufacturing process. However, foam materials do not have as good elastic properties as solid silicone thus their recovery after compression is slower—especially after high loads are applied to the display for extended periods of time. This may lead to errors in force measurements for the input device of the present invention as the force-sensing assembly of electrode layers may introduce hysteresis due to the compressed state of the foam. One example of such high load is when a person is sitting on a mobile device because it is in their back pocket.

To address this limitation of prior art devices, a micro-thin (with a thickness or width under 2 mm) gasket may be dispensed as a solidifying liquid on the back side of the cover glass 110 and allowed to form a more elastic compressible seal 144—see FIGS. 2c and 2d. After the liquid silicone is cured, the gasket 144 may be bonded to the ledge 142 of the rigid substrate 140 using silicone adhesive or an adhesive transfer tape so that it is permanently attached for structural integrity and quality of the seal. The edge of the cover glass 110 may be formed so as to position the cover glass 110 and display 120 sub-assembly over the gasket 144 in a way to minimize the gap between the cover glass 110 and the raised peripheral portion 148 of the rigid substrate 140. This may further help in sealing the input device of the present invention.

The term "solid" is used herein to describe a material without any bubble-type voids or inclusions and to differentiate from a foam material. Solid materials of the invention can still be easily deformed. Typically, they may be selected to restore their shape once the external force of deformation is removed.

A capacitive force-sensing array may be positioned under the display 120 and above the planar bottom portion 147 of the rigid substrate 140. For design shown in FIG. 1, a first electrode layer 130 may include one or a plurality of first electrodes 132 operatively connected to control circuitry and distributed over the internal surface of the display 120 facing inwards and on the opposite side of the cover glass 110. In embodiments, the first electrode layer 130 may have a plurality of discrete first electrodes 132 or a matrix configuration to enable more sensing elements which may be advantageous especially for larger displays such as a tablet or a laptop computer.

This first electrode layer 130 may be generally thin and easily deformable so as not to impact the deformation of or inward prolapse/depression movement of the display 120 when an external force is applied thereto. In one example, the first electrode layer 130 may be made using a copper-clad polyimide film with first electrodes 132 formed thereon.

In other embodiments, the first electrode layer may be formed with conductive ink deposited onto PET film or metalized using vacuum deposition techniques. The first electrode layer 130 may further be attached to or adhered onto the internal surface of the display 120.

In further embodiments, the first electrode layer 130 may be formed onto the display 120 directly. For example, the first electrodes 132 may be bonded, painted, deposited as conductive ink or otherwise permanently positioned right onto the internal surface of the display 120. In this case, the thickness of the input device of the invention may be further reduced and reliability may be further increased by avoiding detachment and shifting of the first electrode layer 130 from the display 120.

A second electrode layer 180 may be formed by electrical grounding a conductive rigid substrate 140. In other embodiments, the second electrode layer 180 may be made by depositing a layer of electrically-conductive ink or paint or otherwise metallizing the internal surface of the planar bottom portion 147 of the rigid substrate 140 made from a non-conductive material.

Both the first electrode layer and the second electrode layer may be designed to position electrodes throughout the display including its central area—and not just on the corners as suggested in the prior art. Sensing force throughout the surface of the input device may further increase reliability of its performance.

Individual first electrodes 132 of the first electrode layer 130 and the second electrode layer 180 (with one or more second electrodes) may be operably connected to control circuitry using an integrated circuit (IC—not shown), which may be configured to measure capacitance therebetween—as described in more detail below.

Application of an external force onto the cover glass 110 and through the display 102 will cause a compression deformation of the dielectric compressible structure 170. Traditionally, the cover glass 110 material is thought to be rigid and the gasket 144 material function is to provide a seal. Uniquely in the present invention, in addition to the elastic deformation of the dielectric structure 170, at least one or both the elastic deformation of the compressible gasket 144 and the elastic inward prolapse of the cover glass 110 (or a display 120) will contribute to the overall elastic compressible behavior of the sensor. These elastic deformations cumulatively result in reduction of a predefined gap or distance between the first electrode layer and the second electrode layer, whereby affecting capacitance therebetween. Furthermore, removal of the external force will cause a rapid restoration of the initial predefined gap between the first and second electrode layers and recovery of the input device overall. All three compressible elastic elements (cover glass 110, gasket 144 and dielectric compressible structure 170) may be selected and designed (such as an optimal thickness of the cover glass for example) to facilitate resilient flexing based on the size of the display and the desired anticipated force. This may be done in addition to selecting a gasket material to be similar to a solid compressible structures that are used for the compressible dielectric structure 170 to assure complete recovery of the gap between electrode layers immediately after removal of the external force. This rapid recovery is needed so as to not impede operation of the input device when external force is applied multiple times in rapid succession and in various locations of the display 120.

While the idea of using a combination of a first electrode layer 130 together with the electrically grounded housing (such as a rigid substrate 140) serving as a second electrode layer with an airgap inbetween is desirable in principle, fabrication of a reliable mobile device which can survive multiple drops and flexing while in someone's back pocket is not a simple undertaking. A single thin gasket 144 around the cover glass will not meet reliability requirements as a sudden shift in the internal components may lead to their failure. To improve reliability, the entire assembly of the rigid substrate 140 with its internally-mounted display 120 and other layers of the assembly shown in FIG. 1 adhered to each other may further be attached to or housed in a cover 150. The cover 150 may form an external back surface of the device while the touch-sensitive display 120 may be positioned on the front of the device. The cover 150 may be used to protect the rigid substrate 140 and the force-sensitive capacitance sensor array from measurement errors due to application of external forces coming from the back of the electronic device. Providing a gap between the cover 150 and the planar portion 147 will provide some isolation with the rigid substrate 140 when any external forces are applied thereto other than that over the display 120.

The display 120 may be touched in use (through a cover glass 110) at various locations thereof. The present invention provides a design adapted to measure the force of touch accurately despite a variety of circumstances and locations at which an external force is applied.

In some circumstances, an external force may be applied near the edge of the display 120 as seen in FIGS. 3a and 3b as well as in FIGS. 3c and 3d. In this case, the display 120 may remain relatively straight and free of deformation while the gasket 144 is compressed on one side leading to a tilt of the display 120 relative to the rigid substrate 140—as the opposite side of the gasket 144 remains not compressed or even stretched.

In other circumstances, the display 120 may be compressed in its central portion causing deformation thereof (as well as the cover glass 110) and/or compression of the gasket 144 causing the display to move closer to the planar bottom portion 147—as seen in FIGS. 4a and 4b. Deformation of the display 120 may cause a gap 155 between the display 120 and the planar bottom portion 147 of the rigid substrate 140 to be reduced in a middle position as compared to its periphery.

All of these varieties of deformations and depression movements of the display 120 may cause the first force-sensing electrodes 132 of the force-sensing electrode layer 130 to change their distance to the second electrode layer 180 positioned on or incorporated with the internal surface of the planar bottom portion 147—resulting in changing of capacitance therebetween. Such change in capacitance may be detected and translated into a force-signal by the control circuitry as described later in greater detail.

One embodiment of a force-sensing capacitance sensor array is shown in FIG. 5 in which the first electrode layer 130 is separated from the second (ground) electrode 180 by a compressible dielectric structure 170—forming together the force-sensing capacitance array. Compliant dielectric structure 170 may be bonded to both the first 130 and second 180 electrode layers so as to eliminate any relative sliding motions or shifts therebetween, therefore increasing reliability of the entire input device of the invention. This can be achieved for example either via wet silicone bonding adhesive or via a double-sided or an adhesive-transfer tape. The compliant structure 170 may be positioned throughout the area of the display and include silicone structures, small pieces of compressible foam sheets or stamped metal flexures as disclosed in more detail in my U.S. Pat. No. 8,169,332.

FIG. 6 shows another embodiment of the device 100 in which the compressible structure 170 is glued to a metallized inner surface of the planar bottom portion 147 by a layer of adhesive 174. FIG. 7 shows this design being compressed causing a reduction in gap between the electrodes 130 and 180—which may be detected by the control circuitry and translated into a force signal.

FIG. 8 shows a third embodiment of the present invention in which the gap between the first electrode layer 130 and the metallized internal surface of the planar bottom portion 147 contains compressible foam elements 178 secured in place by an adhesive tape 176 of other suitable means.

In further embodiments, the first electrode layer 130 may include a single first electrode 132 painted or bonded onto the internal surface of the display 120 while the second electrode layer may include more than one individual electrodes spaced throughout the planar bottom portion 147 and configured to measure capacitance therebetween.

Control circuitry may be provided as described above to independently detect the location of touch by the external object (using display 120) and separately determine the force of touch from the cumulative change in capacitance between the first electrode layer 130 and the second electrode layer 180. As the location of touch may vary from the middle of the display 120 towards its periphery, the compression and deformation of various components of the input device of the present invention may vary as well. Such variability will produce different output capacitance measurements even when the same force is applied throughout the display 120.

To compensate for this variability, the following calibration procedure may be conducted once during design phase or the manufacturing of the input device and its results may be stored in the control circuitry in order to provide correction to force measurements when the device is in use.

FIG. 9 shows one example of a procedure designed to make the present invention insensitive to location of touch while still measuring reasonably accurately the force of compression. During such calibration procedure, a known force may be applied to various positions along the display 120 and resulting cumulative capacitance signal from all sensors may be associated with that known force. This process may be then repeated for other levels of touch force. Once calibrated, the device may be equipped with electronic memory to utilize that calibration data during all subsequent uses of the device 100.

As described above, the force signal obtained from the capacitance sensor array may be combined with the location of touch data obtained from the touch-sensitive display to provide the combined location- and force-sensitive input device.

The present invention provides the simplicity of a unified electrode design to save on material costs, but introduces the compliant dielectric structure 170 located between and bonded to both the first electrode layer 130 and the second electrode layer 180 so as to provide for improved mechanical durability and performance.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A force-sensing touch screen input device comprising:
    a display with a touch-sensitive external surface protected by a cover glass facing outwards and an opposite internal surface facing inwards, said display is configured to allow detection of a location of touch of said touch-sensitive external surface by an external object,
    a rigid substrate made from a conductive material, said rigid substrate comprising a planar bottom portion and a raised peripheral portion surrounding thereof, said peripheral portion further comprising a ledge evenly spaced apart from said planar bottom portion and located underneath said display, said ledge configured to support said display with said cover glass through a compressible gasket located between said ledge and said display, and
    a capacitance force sensor array formed between said display and said planar bottom portion, said capacitance force sensor array comprising:
        a first electrode layer having at least one first electrode, said first electrode layer is attached to, adhered to or formed onto said internal surface of said display, and
        a compressible dielectric structure attached to or adhered to both said first electrode layer and said conductive planar bottom portion of said rigid substrate acting as a second electrode layer so as to retain said first electrode layer and said planar bottom portion together with a predefined gap therebetween, said compressible dielectric structure is formed with a plurality of voids throughout thereof,
    whereby said display and said capacitance force sensor array are retained within said rigid substrate without additional fasteners, and
    wherein touching said touch-sensitive surface of said display through said cover glass by said external object causing at least one of an inward deformation of said display or a movement thereof towards said planar bottom portion of the rigid substrate, causing in turn compression of said compressible gasket and said compressible dielectric structure and a change in capacitance between said first electrode layer and said second electrode layer, thereby allowing to measure said force of touch using said change in capacitance.

2. The input device as in claim 1, wherein said display is sized to be larger than said capacitance force sensor so as to cover both said capacitance force sensor and said compressible gasket located outside said capacitance force sensor.

3. The input device as in claim 1, wherein said compressible dielectric structure is permanently attached to said first electrode layer and said second electrode layer, said compressible dielectric structure is distributed throughout said capacitance force sensor array.

4. The input device as in claim 1, wherein at least one of said cover glass or said display is made from glass configured to allow elastic inward deformation when depressed by said external object and recovery from such deformation when said external object is removed.

5. The input device as in claim 4, wherein said compressible gasket between said cover glass and said ledge of said rigid substrate is formed using an elastic compressible dielectric foam.

6. The input device as in claim 4, wherein said compressible gasket between said cover glass and said ledge of said rigid substrate is formed using a solid elastic material less than about 2 millimeters wide.

7. The input device as in claim 6, wherein said elastic solid material is compressible silicone.

8. The input device as in claim 1 further comprising a back cover attached to said rigid substrate and spaced apart from said planar bottom portion thereof so as to protect said planar bottom portion from any deformation thereof.

* * * * *